(No Model.)

J. GOODFELLOW.
EMERGENCY BRAKE FOR CARS.

No. 493,705. Patented Mar. 21, 1893.

WITNESSES:
John Buckler,
O. J. Morgan

INVENTOR
James Goodfellow,
BY
Worth Osgood,
ATTORNEY.

UNITED STATES PATENT OFFICE.

JAMES GOODFELLOW, OF BROOKLYN, NEW YORK.

EMERGENCY-BRAKE FOR CARS.

SPECIFICATION forming part of Letters Patent No. 493,705, dated March 21, 1893.

Application filed July 13, 1892. Serial No. 439,870. (No model.)

*To all whom it may concern:*

Be it known that I, JAMES GOODFELLOW, of Brooklyn, county of Kings, and State of New York, have invented certain new and useful Improvements in Emergency-Brakes for Cars, of which the following is a full, clear, and exact description, reference being had to the accompanying drawings, and to the letters of reference marked thereon.

My invention relates to brakes, particularly for use upon cable, electric and other styles of cars running upon street railways, which brakes are intended as auxiliaries to any of the usual forms of brakes and for use in cases of emergency.

The object of my invention is to produce or supply a simple, cheap and effective brake which may be easily applied upon cars without in any way interfering with the ordinary brakes and which may be instantly brought into operation to effectually brake or check the movement of the car at any time when the other brakes fail to perform their work or at any time when it becomes necessary to suddenly stop or check the car to avoid accidents, &c.

To accomplish all of this and to secure other and further advantages in the matters of construction, operation and use, my improvements involve the use of a pair of blocks or lugs arranged to ride ordinarily free and clear of the track, and when required for use, to be carried down and against the rails with such force as to effectually check the movement of the car or stop it altogether.

My invention also includes minor arrangements or combinations of parts or appliances for operating the brake blocks, all of which will be herein first fully described and then pointed out in the claims.

Figure 1:
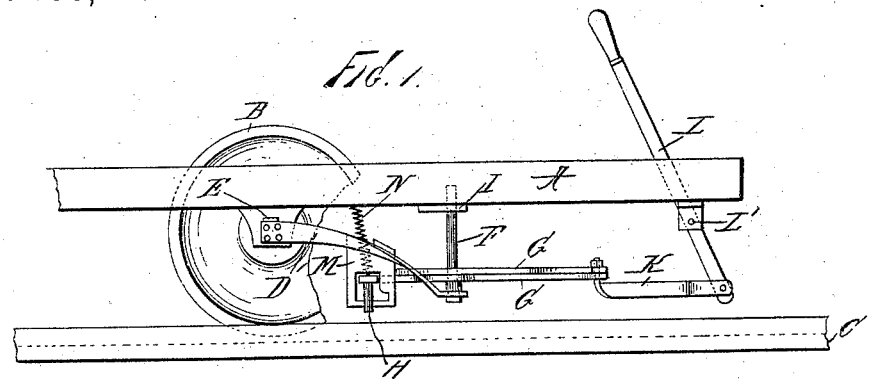
Figure 2:
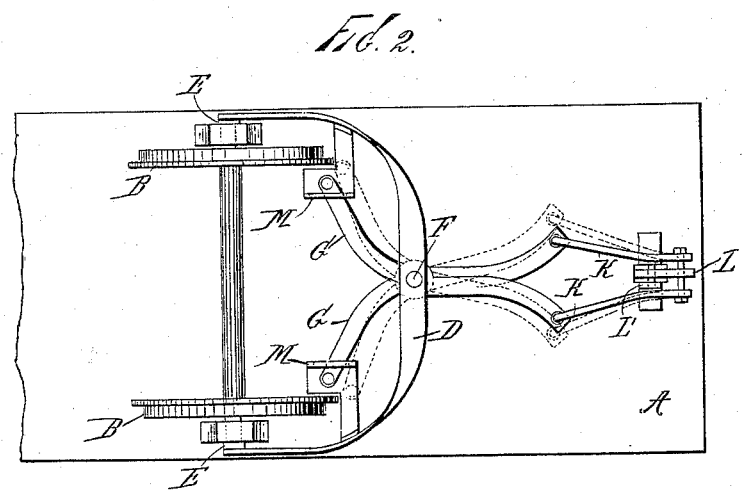
Figure 3:
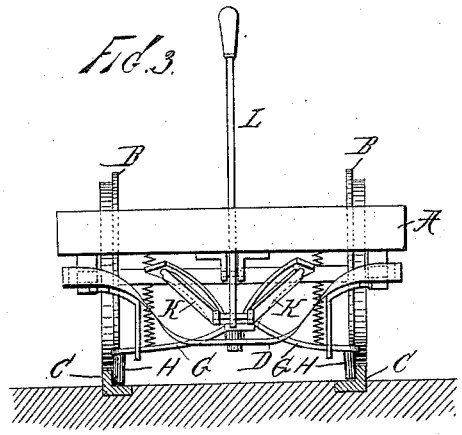

In the drawings Figure 1 is a side view and Fig. 2 is a plan of the under side of a car showing my improved brake mechanism in position thereon, the dotted lines in Fig. 2 indicating the position which some of the parts will assume when the brake is brought into action. Fig. 3 is a view in cross section and elevation indicating the manner in which the brake blocks are brought into contact with the rails in order to act in the manner required.

In all the figures, like letters of reference wherever they occur indicate corresponding parts.

A represents the car platform and B B the car wheels to which any of the ordinary forms of brakes may be applied in the usual ways.

C C are the rails or tracks on which the car is to run.

As my improved emergency brake is intended to clutch or grip the track it is important to sustain or suspend it in such manner that it will be carried in a nearly constant relation to the track and not subjected to variations in distance from the track such as would result from the vibrations or movements of the car body if connected directly therewith. I therefore provide a sustaining bar D of ample strength, the same extending across under the car and being firmly bolted or otherwise secured to the axle boxes E, which axle boxes may be of any pattern and which ordinarily maintain a constant distance from the track. At the central part of bar D is pivoted the axis F of two shear arms G G crossing each other and carrying at their outer ends lugs or blocks H H applied thereon in some substantial manner or made a part thereof and intended to bear against the rails C. The two shear arms move upon the axis F and the axis itself is movable in its seat in bar D so that the arms G may be tipped to raise or lower their extremities. The upper end of axis F is suitably guided as by a guide plate I secured to the car body, serving to prevent side movements of the axis while it admits of the tipping movements thereof in the direction of the length of the car.

The shear arms G are operated by two connecting arms K K, and these in turn by a hand lever L pivoted as at L' and extending up so as to be within convenient reach.

Under the arrangement so far described, by pushing on the upper end of hand lever L the arms K will tip the arms G thus bringing the lugs H down from the ordinary position in which they ride to a level with the track and will also move the arms G on the axis F so that they will likewise carry lugs H outwardly toward the tracks. The arrangement affords a very powerful leverage by which the lugs are forced to their bearings against the tracks, and a little power applied for the purpose will effectually and instantly stop the car or check its movement as may be desired.

At M. M. are guides for the outer ends of arms G, the same being secured to the bar D. These are slotted as shown to permit the arms G to move therein. In the first portion of the movement of the mechanism the slots in guides M permit rather free movements of said arms, the bottoms of the slots limiting the downward movement, and when the arms reach the horizontal portion of the slot they are thereafter confined so that all further movements are limited to an outward direction, the object being to effect the braking by an outward thrust upon the rails and not by any downward thrust.

To release the clutch and to return the arms G and connected parts to their ordinary positions any suitable form of returning springs may be employed. N represents such a spring, being connected at one end to the car body and at the other to an arm G and inclined in such way that it will act in the desired direction.

The improved device may be easily and cheaply applied upon any of the ordinary forms of cars wherever it may be desired to use it and it will be found to answer the purposes and objects of the invention without damage to the road bed or the rails.

The rails shown are of the flanged pattern such as are commonly used on street railways.

The invention may be used in connection with other patterns of rails.

One set of the emergency brakes will be sufficient for each car, hand levers being supplied at each end with suitable connections as are well understood and not necessary to be illustrated herein. Instead of the hand lever L being arranged to be pushed to bring the brakes into action it might be arranged to be pulled by varying the connections in well known ways.

Having now fully described my invention, what I claim as new herein, and desire to secure by Letters Patent, is—

1. In an emergency brake, the pivoted or hinged arms carrying the brake lugs, said arms being mounted upon and combined with a supporting bar attached to the car axle boxes, substantially as and for the purposes set forth.

2. In combination with the hinged arms carrying the brake lugs arranged to bear against the tracks, the movable axis supported as explained, its upper end being guided, substantially as shown and for the purposes set forth.

3. In an emergency brake, the combination with the hinged arms carrying the brake lugs and arranged to tilt as explained, of the slotted guides operating to guide said arms substantially as and for the purposes set forth.

4. In an emergency brake, the combination of the hinged arms carrying the brake lugs and arranged to tilt as explained, a hand lever, connecting arms and slotted guides for the hinged arms, substantially as shown and described.

In testimony that I claim the foregoing I have hereunto set my hand in the presence of two witnesses.

JAMES GOODFELLOW.

Witnesses:
W. J. MORGAN,
WORTH OSGOOD.